United States Patent Office 3,328,571
Patented June 27, 1967

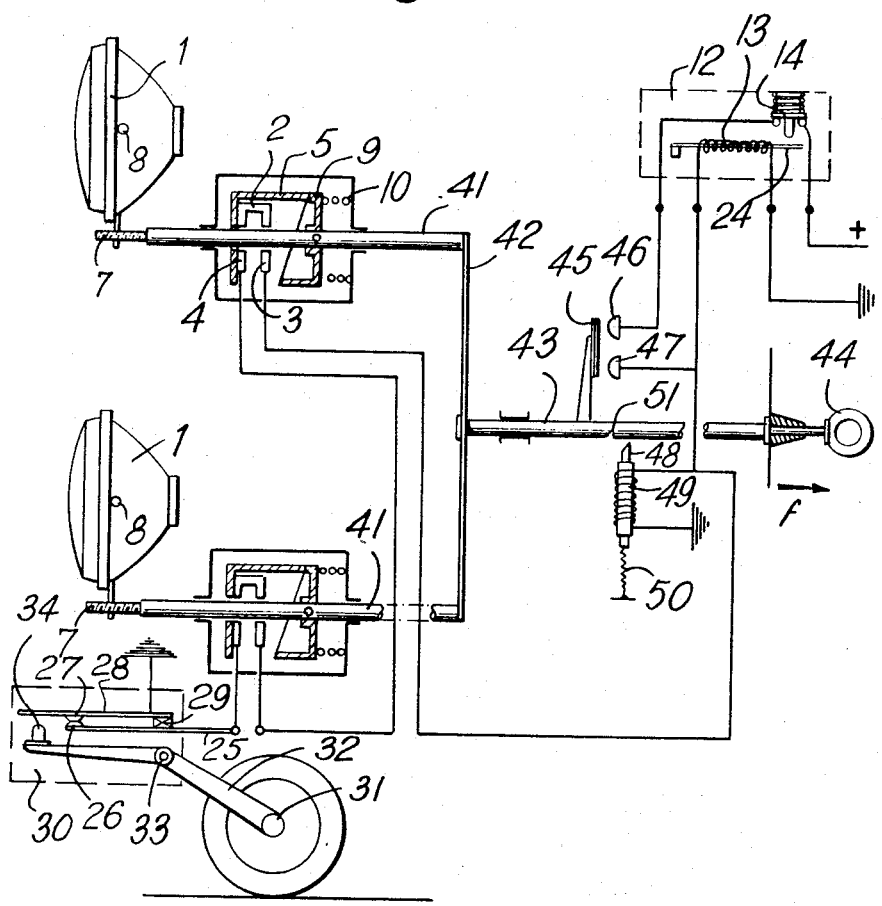

3,328,571
AUTOMATIC REGULATOR OF THE INCLINATION OF VEHICLE HEADLAMPS AS A FUNCTION OF THE LOAD ON THE VEHICLE
Pierre Cibié, 150 Ave. de Wagram, Paris 17, France
Filed Mar. 26, 1965, Ser. No. 443,127
Claims priority, application France, Apr. 1, 1964, 969,278, Patent 1,398,847; Oct. 15, 1964, 991,479, Patent 86,918
10 Claims. (Cl. 240—7.1)

ABSTRACT OF THE DISCLOSURE

A device for adjusting the attitude of a vehicle headlamp, comprising a spiral bi-metal strip acting as a load reference connected to an electrical detector of the state of loading of the vehicle. One extremity of the strip is fixedly secured and the other end is connected to a rotatable abutment against which is elastically applied a coaxial, axially displaceable state-of-loading cam which tilts the headlamp about a horizontal axis. A mechanism acts on the cam to move the same away from the abutment during a momentary energization of the bi-metal strip to allow the abutment to be shifted angularly and axially as a function of the loading condition of the vehicle.

---

Figure 1:
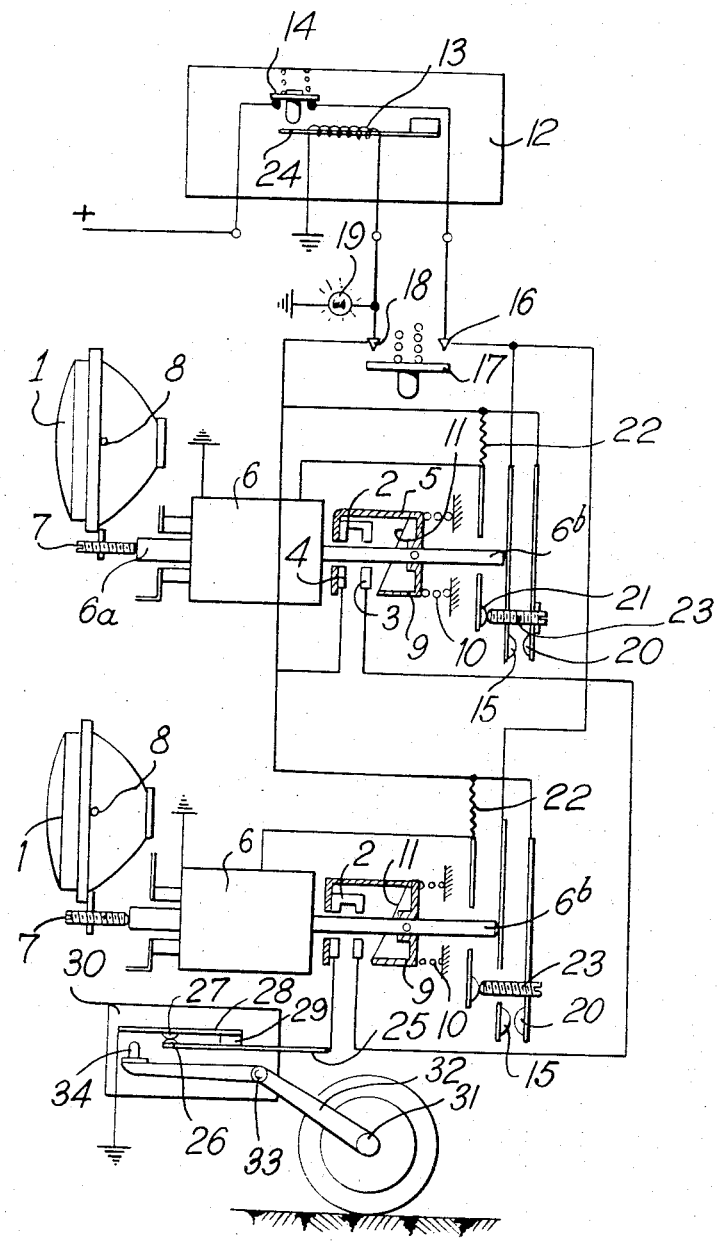

The light beams emitted by conventional headlamps fixedly mounted on a motor vehicle undergo angular variations as a function of the load on the vehicle, resulting either in the beams being directed upwardly and dazzling the drivers of oncoming vehicles, or in their being directed downwardly to the detriment of the expanse illuminated by the beams.

With a view to overcoming this disadvantage, recourse has already been had to means for adjusting the headlamps as a function of the load on the vehicle carrying them.

It is the object of the present invention to permit automatic regulation of such headlamps as a function of the load and to accordingly provide a device comprising a spiral bi-metal strip acting as a load reference connected to an electrical detector of the state of loading of the vehicle and of which one extremity is fixedly secured and the other connected to a rotatable abutment against which is elastically applied a coaxial, axially displaceable state-of-loading cam which tilts the headlamp optical unit about a horizontal axis, means being provided for moving said cam away from said abutment during a momentary energization of said bi-metal strip whereby to allow said abutment to be shifted angularly as a function of the loading condition of the vehicle. Thus, when the bi-metal strip is de-energized, the cam is applied anew elastically against the angularly shifted abutment, thereby adjusting the upward or downward tilt of the optical unit as a function of the load on the vehicle.

Likewise in accordance with the invention, the means for moving the state-of-loading cam away from the rotatable abutment may be an electromagnet shunted across the bi-metal strip, onto the core of which said state-of-loading cam is fixed, said core bearing against an inclination adjustment screw carried by the optical unit of the headlamp.

In an alternative form of the invention, the means for moving the state-of-loading cam away from the rotatable abutment is a manually operable cam-displacing device, which device is associated to means for energizing the bi-metallic strip when the cam recedes, to a member for locking said device in the position of spaced relationship of said cam, and to a timer for simultaneously retracting this member, returning the state-of-loading cam into contact with the rotatable abutment, and cutting off the electric current to the bi-metal strip.

The description which follows with reference to the accompanying non-limitative exemplary drawings will give a clear understanding of how the invention can be carried into practice.

In the drawings:

FIG. 1 schematically illustrates a regulator of the inclination of motor vehicle headlamps according to the invention; and FIG. 2 schematically illustrates an alternative form of embodiment of the regulating system of FIG. 1.

In the specific form of embodiment of the invention shown in FIG. 1, the device for automatically regulating the light beams from headlamps as a function of the load on the vehicle carrying such headlamps, comprises, in respect of each headlamp 1, a spiral bi-metal strip 2 of which one end 3 is fixedly secured and the other end 4 rigidly connected to an abutment 5 which is rotatable about the axis of the bi-metal strip. Aligned on this axis is the core of an electromagnet 6 inserted into an opening formed in the bodywork, and the front portions 6a of this core serves as an abutment cooperating with an adjustment screw 7 carried by the optical unit of the headlamp 1, which unit is adapted to pivot under gravity about a horizontal axis such as the pivot 8. The rear portion 6b of said core carries a cam 9 which thrusts against a spring 10 and the cam track 11 of which is helical and represents possible variations in the loading condition of the vehicle. The system comprises a timer 12 incorporating a relay 13 and a normally-closed button 14 for energizing a contact 15.

The button 14 is connected to the positive pole of the battery and also to one of the fixed studs 16 of a normally-open pushbutton 17 whose other fixed stud 18 is connected to the relay 13, to an indicator lamp 19, to the electromagnet 6 and to a normally-open contact stud 20 positioned opposite the contact points 15. A contact point 21 is connected in parallel with the point 20 through a resistor 22, and this contact point 21 is normally closed onto contact point formed on a screw 23 carried by the flexible blade bearing the contact point 20.

When the system is energized by closing the pushbutton 17 after the vehicle has been loaded, electromagnet 6 is energized and its core attracted rearwardly. In the course of this movement the cam 9 compresses the spring 10 as it recedes from the abutment 5. The core portion 6a moves away from the adjustment screw 7, allowing the optical unit of the headlamp to tilt downwardly about the pivot 8. Simultaneously, the contact 15-20 closes responsively to the core portion 6b and energizes the relay 13 in the timer 12.

At the same time, the end 4 of the load-datum spiral bi-metal strip 2 shifts angularly about the axis of said strip through an angle dependent upon the state of loading of the vehicle and responsively to a state-of-loading sensor of any convenient type. The angular shift of the end 4 of bi-metal strip 2 causes the abutment 5 to rotate about said axis into a position corresponding to this state of loading.

After a time lapse dependent upon the characteristics of the timer, the relay 13 operates through its travelling arm 24 on the pushbutton 14, thereby opening the electromagnet feed circuit.

The electromagnet core is then thrust forward under the urge of the spring 10 and the cam contacts the angularly-shifted abutment 5 at a point on its cam track 11 corresponding to the state of loading of the vehicle. The optical unit of the headlamp responds to this motion through the cooperation of the core portion 6a with the screw 7 and the beam emitted by the headlamp is thereby adjusted vertically to suit said state of loading.

The state-of-loading sensor may advantageously comprise, in respect of at least one of the vehicle axles, a thermal switch 25 connected in series to the likewise series-connected spiral bi-metal strips 2. The thermal switch 25 carries a normally-closed contact point 26 closed onto a contact point 27 carried by a flexible blade 28 mounted on an insulating support 29 rigid with a support 30 fixed to the body of the vehicle. Additionally mounted on the axle 31 whose state of loading is to be sensed is an arm 32 pivotally connected as at 33 to the support 30 and bearing a finger 34.

The thermal switch 25 is energized by closure of the pushbutton 17 and is thereby distorted and tends to move the contact point 26 away from the contact point 27 (which is urged thereagainst by the elastic blade 28) until contact is broken under the action of the finger 34, the position of which is dependent upon the load on the corresponding axle. As a result, the amount of current flowing through the bi-metal strips 2 depends on the time for which the contact 26, 27 remains closed, i.e. on the state of loading of the axle 31, thereby causing the angular shift sustained by the ends 4 of the spiral bi-metal strips 2 to be likewise dependent upon said state of loading.

Reference is now had to FIG. 2 for an alternative embodiment to the invention, in which like parts or parts performing identical functions are designated by like numerals. In this constructional form also the optical units of the headlamps 1 are pivotable about a pivot 8 and are equipped with an adjustment screw 7. Likewise utilized is a spiral bi-metal strip 2 of which one extremity 3 is fixedly secured and the other extremity 4 is rigid with an abutment 5 rotatable about the axis of said bi-metal strip. Concentrically with the latter is mounted a rod 41 whose front portion acts as an abutment for the screw 7. The rear portion of said rod carries the state-of-loading cam 9 bearing against a spring 10 and the cam track 11 of which is helical and represents the possible fluctuations in the state of loading of the vehicle. The rods 41 of the two headlamps are interconnected by a cross-member 42 to which is fixed a shaft 43 rigid with an actuating grip 44.

The two bi-metal strips 2 are connected in series, and one of these strips is additionally connected to a state-of-loading sensor of any convenient type and is grounded through the medium thereof. The other bi-metal strip is connected to the grounded relay 13 of a timer 12. This timer comprises a normally-closed button 14 which is inserted into the line connecting it to the positive battery pole and which is adapted to be actuated by a travelling blade 24.

The shaft 43 of the operating grip carries a contact piece 45 adapted to contact two contact studs 46, 47 whereby to close the line for energizing the bi-metal strips 2 and the relay 13. A lock 48 responsive to a coil 49 in parallel with the timer relay feedline, is adapted, on energization of said coil 49, to move towards the shaft 43 against a countering spring 50 and thereby engage in a notch 51 formed on said shaft.

The device hereinbefore described functions in the following manner:

Assuming the automatic regulator to have the configuration shown in the figure before the vehicle is loaded, then, after the vehicle has been loaded, the grip 44 and its associated shaft 43 are pulled in the direction of the arrow f, thereby causing the state-of-loading cam 9 to be moved away from the rotatable abutment 5 and in so doing to compress the spring 10. The front portions of the rods 41 move away from the adjustment screws 7, causing the optical units of the headlamps to tilt downwardly about the pivots 8.

Simultaneously, the part 45 contacts the studs 46 and 47, and the bi-metal strips 2 and the timer relay 13 are energized. The ends 4 of the bi-metal strips perform the function of load references and shift angularly about the rods 41 through an angle dependent upon the state of loading of the vehicle, as indicated by the state-of-loading sensor. This angular shift causes the abutment 5 to pivot about the rod 41 into a position corresponding to this state of loading. During this time, the coil 49, being energized, thrusts the lock 48 against the countering spring 50 into engagement with the notch 51, in order to lock the operating grip.

After a certain time lapse dependent upon the characteristics of the timer 12, the relay 13 operates on the button 14 through the travelling arm 24, thereby simultaneously cutting off the current to said relay, to the coil 49 and to the bi-metal strips 2. The lock 48 is then retracted into its inoperative position by the spring 50, at the same time as the springs 10 simultaneously thrust the state-of-loading cams 9 and the rods 41 forward. These cams contact the angularly-shifted abutments 5 at a point on their cam tracks 11 corresponding to the state of loading of the vehicle. The optical units of the headlamps respond to this motion through action of the front portions of rods 41 on the screws 7, and the beams emitted by the headlamps are thus adjusted vertically to suit said state-of-loading. The movement of the operating grip in response to the springs 10 breaks the contact between the part 45 and the studs 46 and 47.

The state-of-loading sensor 26 through 34 is of a kind similar to that described precedingly and is similarly connected. It is therefore unnecessary to describe this sensor and its manner of operation once more.

It goes without saying that many changes and substitutions of parts may be made in the specific forms of embodiment hereinbefore described, without departing from the scope of the invention. By way of example, any other type of load sensor adapted to ensure a flow through the spiral bi-metal strip of an amount of current dependent upon the state-of-loading of one or both axles of the vehicle may be associated to the regulator described hereinabove; similarly, any convenient means for moving the cam away from the abutment, such as a bi-metal strip for instance, may be used in lieu of an electromagnet core or a manually-operated device. It is, therefore, to be understood that the description hereinbefore set forth is not to be considered a limitation of the invention, but that changes may be made within the scope of the invention as set forth in the appended claims.

What I claim is:

1. An automatic regulator of the inclination about a horizontal axis of the optical unit of the headlamps of a vehicle having a battery, as a function of the load on the vehicle, comprising in combination, for each headlamp of said vehicle, a bi-metal strip, means for fixedly securing one end of said strip to the vehicle, a rotatable abutment rigidly connected to the other end of said strip, an axially-movable state-of-loading cam coaxial with said strip, means for swivelling said optical unit of the headlamp about its horizontal axis, which means is operatively connected with said cam, means for elastically applying said abutment against said cam, and, for all the headlamps of the vehicle, an electric sensor of the state-of-loading of the vehicle, electrical connections between said sensor, said battery of the vehicle and the strips corresponding to all the headlamps, means for providing a momentary energization of said strips by said sensor as a function of the state of loading of the vehicle, and, for each headlamp, means for axially moving said cam away from said abutment during said momentary energization.

2. An automatic regulator according to claim 1, wherein said sensor, said battery and said strips are connected in series.

3. An automatic regulator according to claim 1, wherein said axially-movable state-of-loading cam has a helical cam track formed thereon.

4. An automatic regulator of the inclination about a horizontal axis of the optical unit of the headlamps of a vehicle having a battery, comprising in combination for each headlamp of said vehicle, a bi-metal strip, means for fixedly securing one end of said strip to the vehicle, a rotatable abutment rigidly connected to the other end of said strip, an axially-movable state-of-loading cam co-axial with said strip, means for elastically applying said abutment against said cam, and, for all the headlamps of the vehicle, an electric sensor of the state-of-loading of the vehicle, electrical series-connections between said sensor, said battery of the vehicle and the strips corresponding to all the headlamps, means for providing a momentary energization of said strips by said sensor as a function of the state-of-loading of the vehicle, and, for each headlamp, an electromagnet parallel-connected to said strip and having a core, which is fixed to said cam, for shifting said cam away from said abutment, a screw mounted on the headlamp away from its horizontal axis for the inclination adjustment of said headlamp, and means for pressure contacting said core with said screw.

5. An automatic regulator according to claim 4, wherein said means for providing a momentary energization of said strips by said sensor as a function of the state-of-loading of the vehicle comprises a timer series-connected between said battery and said strips.

6. An automatic regulator of the inclination about a horizontal axis of the optical unit of the headlamps of a vehicle having a battery, comprising in combination, for each headlamp of said vehicle, a bi-metal strip, means for fixedly securing one end of said strip to the vehicle, a rotatable abutment rigidly connected to the other end of said strip, an axially-movable state-of-loading cam coaxial with said strip, means for elastically applying said abutment against said cam, and, for all the headlamps of the vehicle, an electric sensor of the state of loading of the vehicle, electrical series-connections between said sensor, said battery of the vehicle and the strips corresponding to all the headlamps, means for providing a momentary energization of said strips by said sensor as a function of the state of loading of the vehicle, a manually-operable device for shifting the cams of all the headlamps away from the corresponding abutments during said momentary energization, means for swivelling said optical unit of each headlamp about its horizontal axis, which means are operatively connected with said manually-operable device, a member for locking said device in the position it occupies when said cams are shifted away from said abutments, a timer for simultaneously unlocking said member, returning said cams into contact with their corresponding abutments and de-energizing said strips, and means for operatively connecting said device with said timer, with said member and with said means for providing said momentary energization.

7. An automatic regulator according to claim 6, wherein said means for swivelling said optical unit of each headlamp about its horizontal axis comprises a screw mounted on the headlamp away from its horizontal axis for the inclination adjustment of said headlamp.

8. An automatic regulator according to claim 6, wherein said manually-operable device comprises a grip, a rod for each headlamp on which the corresponding state-of-loading cam is fixed, and means for connecting said grip and the rods of all the headlamps.

9. An automatic regulator according to claim 6, wherein the means for momentary energization comprises the timer which has a relay with two terminals and which is series-connected to said strips and to one pole of said battery, a normally-open contact interposed between said timer and said strips, one terminal of said relay being connected between said contact and said strips, the other terminal of said relay being connected to the other pole of the battery, and a part integral with said grip for closing said normally-open contact when said cams recede.

10. An automatic regulator according to claim 6, wherein said member for locking said manually-operable device comprises a lock, a spring for biasing said lock into the unlocking position, and a coil connected in parallel with the relay of said timer for generating a field to which said lock is subjected.

References Cited

UNITED STATES PATENTS 3,177,355    4/1965    Trowbridge    240—7.1
3,229,082    1/1966    Barron    240—7.1

FOREIGN PATENTS 1,131,109    6/1962    Germany.

NORTON ANSHER, *Primary Examiner.*

L. JACOBSON, *Assistant Examiner.*